Patented Apr. 6, 1954

2,674,614

UNITED STATES PATENT OFFICE 2,674,614

THIOCARBHYDRAZINE COMPOUNDS

Jörgen A. Wangel, Saltsjo-Duvnas, Sweden, assignor to Aktiebolaget Pharmacia, Uppsala, Sweden, a company of Sweden No Drawing. Application August 8, 1950, Serial No. 178,350

Claims priority, application Sweden August 17, 1949

6 Claims. (Cl. 260—455)

This invention relates to new thiocarbhydrazine compounds.

Hitherto described hydrazine compounds have proved to be inactive against tuberculosis or in certain cases slightly active, but too toxic to be suitable for therapeutic use.

It has now, surprisingly, been found that certain thiocarbhydrazine compounds have proved to possess a good activity on experimental tuberculosis and as, furthermore, they show a favourable toxicity, they are well suited to be used as chemotherapeutica.

These new compounds according to the invention have the general formula

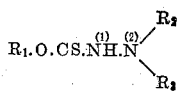

where $R_1$ is a benzyl or a cyclohexyl radical, $R_3$ is a radical selected from the group consisting of —$CO \cdot C_6H_5$, —$CO \cdot CH_3$, —$CS \cdot O \cdot CH_2C_6H_5$ —$CSO \cdot C_6H_{11}$ and hydrogen, $R_3$ and $R_2$ taken together may present =$CHC_6H_5$, $R_2$ otherwise representing hydrogen; $R_1$ being cyclohexyl when $R_3$ is hydrogen.

These particular compounds possess a unique property in that they have low toxicity for both healthy and tubercular mice. In contrast such a closely related compound as $N^1$-benzoxythiocarbonyl-$N^2$-phenylhydrazine, in which $R_3$ is a benzene radical, while being non-toxic for healthy mice is toxic for tubercular mice and consequently would not be suitable for use in treating experimental tuberculosis in mice.

These new tuberculoactive compounds according to the invention may be produced either by the introduction into compounds, in which the radical

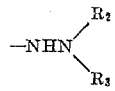

is present, of the radical $R_1 \cdot O \cdot CS$.—, or by the introduction into compounds, in which the radical $R_1 \cdot O \cdot CS \cdot NH \cdot N$— is present, of $R_2$ and/or $R_3$, or by the introduction into compounds, in which the group

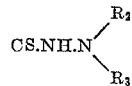

is present, by treatment with reactive derivatives of $R_1O$, of the radical $R_1O$ or, finally, in the case that $R_3$ is the same as $R_1O \cdot CS$., by the introduction simultaneously into hydrazine of two identical oxythiocarbonyl radicals.

Thus, xantogen hydrazides are reacted with carbonyl compounds (for example an aldehyde, an acid halogenide or a carbonyl-thio-glycolic acid) or with a xantogenic acid, its salts or reactive derivatives. Substituted hydrazines with a free $NH_2$-group may be reacted with xantogenic acids, their salts or reactive derivatives, respectively, and the same also applies to hydrazine, its hydrate and salts, respectively.

$N^2$-substituted $N^1$-thionthiol carbonic acid hydrazines, their salts or reactive derivatives, respectively, may be reacted with benzyl alcohol or cyclohexyl alcohol, their alcoholates or reactive derivatives, respectively. Substituted thionthiol carbonic acid esters may be reacted with substituted or not substituted hydrazine, its salts or hydrate, respectively.

The following examples illustrate the invention without restricting the same.

Example 1

18 gms. sodium are boiled in 500 ml. dry cyclohexanol until dissolution has taken place. After cooling the cake thus formed is ground and then suspended in 2.1 ether and boiled for 15 minutes whereupon 64 gms. carbon bisulphide are added. The mixture is then boiled further for 45 minutes and extracted with 1 l. water. The extract is reacted at room temperature with 40 gms. hydrazine hydrate and hereby cyclohexoxythiocarbonyl hydrazine precipitates which after recrystallization from benzene/petroleum ether is obtained in a yield of 95 gms. with a M. Pt. 76–77° C.

Instead of using hydrazine hydrate a salt thereof may be employed in which case this may suitably be neutralized with caustic alkali.

Example 2

To 1.8 gms. benzoxythiocarbonyl hydrazine in 5 ml. ethyl alcohol (95%) are added 1.1 gms. benzaldehyde in 5 ml. ethyl alcohol and hereby benzaldehyde - benzoxythiocarbonyl hydrazone precipitates at room temperature in the form of narrow crystal prisms which after recrystallization from benzene have the M. Pt. 124–124.5° C.

Example 3

To 0.3 mol benzyl xantogen acetic acid in 150 ml. ethyl alcohol (95%) is added the equivalent amount 5-n caustic alkali together with 0.14 mol hydrazine hydrate. After standing for 3 hours at room temperature prismatic crystals of $N^1,N^2$- di-benzoxythiocarbonyl hydrazine with the M. Pt. 118–119.5° C. begin to precipitate.

*Example 4*

To 4 gms. benzoylthio glycolic acid in 20 ml. 1-n caustic alkali are added 3.5 gms. cyclohexoxythiocarbonyl hydrazine in 20 ml. ethyl alcohol (95%) and hereby $N^1$-benzoyl-$N^2$-cyclohexoxythiocarbonyl hydrazine gradually precipitates as prismatic crystals with a M. Pt. 120.5–122.5° C.

*Example 5*

To 18 gms. cyclohexoxythiocarbonyl hydrazine in 60 ml. ethyl alcohol (95%) are added 9.7 ml. acetic acid anhydride and hereby in a short time $N^1$-acetyl-$N^2$-cyclohexoxythiocarbonyl hydrazine precipitates in the form of prismatic crystals with a M. Pt. 138–140° C.

In a corresponding manner $N^1$-benzoyl-$N^2$-cyclohexoxythiocarbonyl hydrazine is obtained when using for instance benzoyl chloride instead of acetic anhydride.

In an analogous manner also the following compounds may be produced:

Benzaldehyde-cyclo-hexoxythiocarbonyl hydrazone, $C_6H_{11}O.CS.NH.N=CH.C_6H_5$ $N^1$ - cyclohexoxythiocarbonyl - $N^2$ - acetyl - hydrazine, $C_6H_{11}O.CS.NH.NH.CO.CH_3$ $N^1$-benzoxythiocarbonyl-$N^2$-acetyl-hydrazine, $C_6H_5CH_2O.CS.NH.NH.CO.CH_3$ $N^1$ - cyclohexoxythiocarbonyl - $N^2$ - benzoyl - hydrazine, $C_6H_{11}O.CS.NH.NH.CO.C_6H_5$ $N^1$-benzoxythiocarbonyl-$N^2$-benzoyl-hydrazine, $C_6H_5CH_2O.CS.NH.NH.CO.C_6H_5$ $N^1$ - benzoxythiocarbonyl - $N^2$ - cyclohexoxythiocarbonyl-hydrazine, $C_6H_5CH_2O.CS.NH.NH.CS.O.C_6H_{11}$ $N^1,N^2$-di-cyclohexoxythiocarbonyl-hydrazine, $C_6H_{11}O.CS.NH.NH.CS.O.C_6H_{11}$

I claim:

1. Thiocarbhydrazine compounds of the general formula $$R_1O.CS.\overset{(1)}{N}H.\overset{(2)}{N}\diagup^{R_3}_{R_2}$$

where $R_1$ is a radical selected from the group consisting of benzyl and cyclohexyl radicals, $R_3$ is a radical selected from the group consisting of —$CO \cdot C_6H_5$, —$CO \cdot CH_3$, —$CS \cdot O \cdot CH_2C_6H_5$, —$CSO \cdot C_6H_{11}$ and hydrogen, $R_3$ and $R_2$ taken together may represent =$CHC_6H_5$, $R_2$ otherwise representing hydrogen; $R_1$ being cyclohexyl when $R_3$ is hydrogen.

2. The new compound benzaldehyde-benzoxythiocarbonyl-hydrazone.

3. The new compound benzaldehyde-cyclohexoxythiocarbonyl-hydrazone.

4. The new compound $N^1$-cyclohexoxythiocarbonyl-$N^2$-benzoyl-hydrazine.

5. The new compound $N^1,N^2$-di-benzoxythiocarbonyl-hydrazine.

6. The new compound $N^1,N^2$-di-cyclohexoxythiocarbonyl-hydrazine.

References Cited in the file of this patent

Bulmer: J. Chem. Soc. (1945), pages 666–674.